United States Patent Office 3,478,673
Patented Nov. 18, 1969

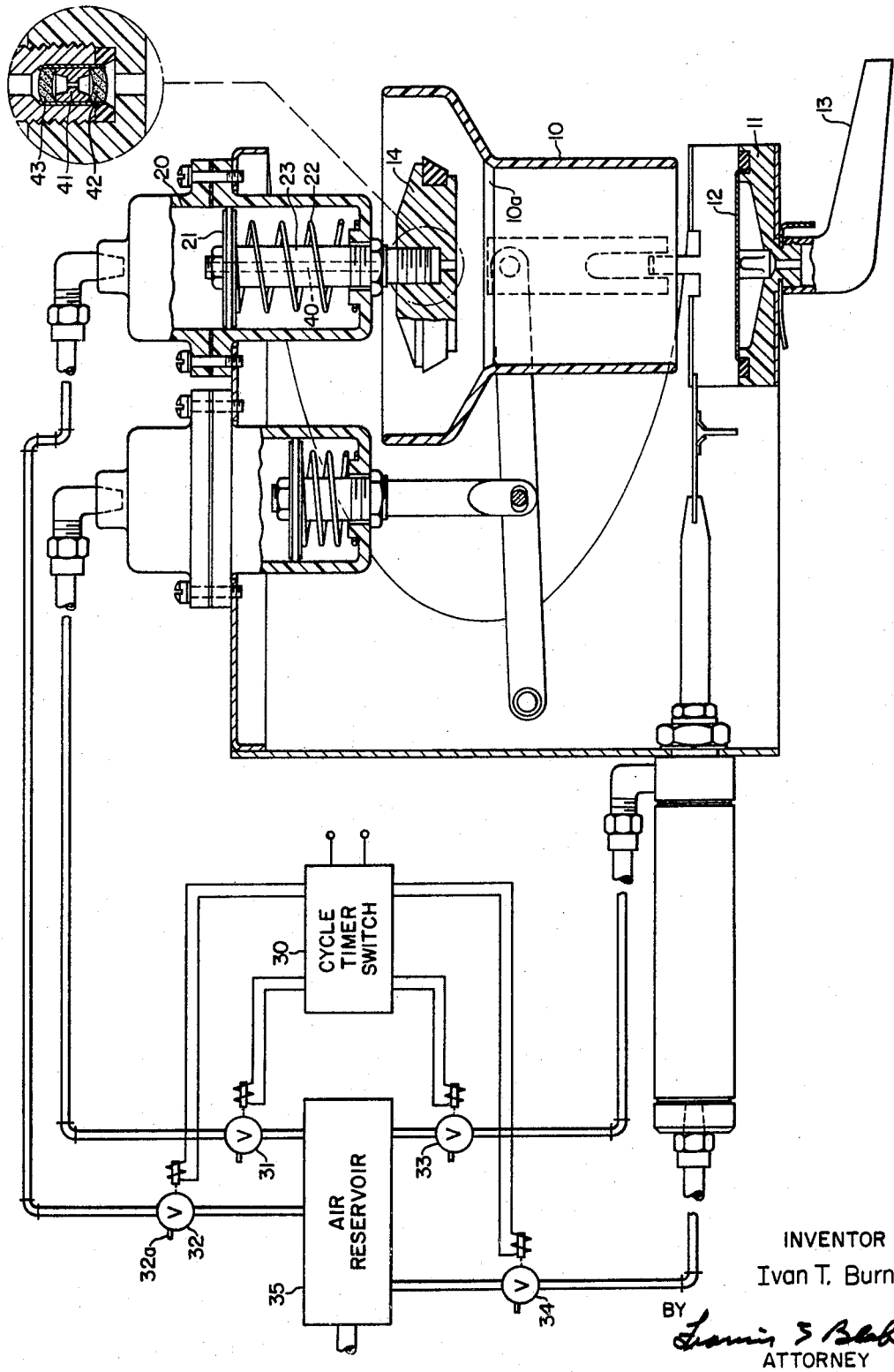

1

3,478,673
APPARATUS FOR PRESSURIZING AN AIR OPERATED SINGLE CUP COFFEE BREWER
Ivan T. Burney, Pittsburgh, Pa., assignor to Westinghouse Electric Corporation, Pittsburgh, Pa., a corporation of Pennsylvania
Filed June 28, 1968, Ser. No. 741,026
Int. Cl. A47j 31/32
U.S. Cl. 99—302
4 Claims

ABSTRACT OF THE DISCLOSURE

In an air operated coffee brewer having a movable stopper and brew cylinder together with an air cylinder with piston and rod connected to the stopper to move the stopped into sealing relation with the brew cylinder during the brew cycle; the pressurizer for the brew cylinder comprising a bore through the piston, rod and stopper with a restriction therein to reduce the flow of air into the brew cylinder and control the rate of build-up of air pressure in the brew cylinder.

Cross references to related applications

An air operated coffee brewer with which the pressurizing arrangement of the present invention may be used is described in the copending U.S. patent application 741,027 assigned to the same assignee as the present invention.

Background of the invention

Air operated coffee brewers of the type disclosed by the above mentioned copending patent application have a movable stopper and an air piston for moving the stopper into sealing relation with the upper open end of a brew cylinder whose lower end may be connected to a filter screen and brewed coffee outlet. In order to extract the brewed coffee through the filter screen in a given period of time known as the brewing time during the brew cycle, air under pressure is introduced into the brew cylinder while the stopper is in sealing relation thereto. If the rate of build-up of pressure in the brew cylinder during the brew cycle becomes excessive, the stopper may become unseated and undesirable leakage of liquid and coffee grounds will occur around the unseated sealing surfaces of the stopper and brew cylinder. Also, if the build-up of pressure is excessive, the coffee may be extracted too quickly resulting in a weak undesirable flavor. One arrangement for preventing excessive air pressure in the brew cylinder during the brew cycle as described in the aforementioned copending patent application is to provide a pressure reducing valve in the air line to the brew cylinder. Pressure reducing valves may be relatively expensive and therefore other arrangements for pressurizing the brew cylinder without the use of a pressure reducing valve and not requiring a separate electrically operated control valve may be desirable in some applications.

Prior art

Applicant is unaware of any prior art arrangements for pressurizing an air operated coffee brewer in a manner similar to his invention.

Summary

According to the invention, a movable stopper for an air operated coffee brewing cylinder is moved into sealing relation with the upper open end of the brew cylinder during the brew cycle by means of an air cylinder. The piston, piston rod and stopper are bored to permit air to be bled from the air cylinder into the brew cylinder while the stopper is maintained in sealing relation to the brew cylinder during the brewing portion of the brew cycle. A restriction is placed in the bore in the path of the air flow from the air cylinder so as to reduce the flow of air into the brew cylinder to an amount that will not provide an excessive rate of build-up of pressure sufficient to unseat the stopper during the brewing time of the brewing cycle or to extract the coffee too quickly.

Further objects, features and the attending advantages of the invention will be apparent with reference to the following specification and drawing.

Brief description of the drawing

The drawing illustrates a side elevation partly in section of an air operated coffee brewer embodying the pressurizing arrangement of the invention, details of which are shown by the enlarged offset.

Description of the preferred embodiment

As mentioned above an air operated coffee brewer construction with which the pressurizing system of the invention may be used is more completely described in the copending patent application Ser. No. 741,027 and reference may be made thereto for a more complete understanding of the air operated single cup coffee brewer. Only the details of those portions of the brewer apparatus necessary for an understanding of the present invention will be described in detail herein.

Referring to the drawing, a movable coffee brew cylinder 10 is adapted to be lowered into sealing engagement with a platform 11 which supoprts a filter screen 12 leading to a brewed coffee outlet conduit 13. In the operation of the brewer during the brew cycle, the brew cylinder 10 is lowered onto the brew platform 11 and coffee and hot water are introduced into the interior of the cylinder, following which a movable stopper 14 is lowered into sealing engagement with the open upper end of the brew cylinder 10 and air under pressure is then introduced into the interior of the brew cylinder 10 to extract brewed coffee through the filter screen 12 and to the coffee discharge outlet 13 during the brew period of the brewing cycle. In order to move the stopper 14 into sealing engagement with the brew cylinder at the desired time during the brew cycle, an air cylinder 20 having a piston 21 and a return spring 22 is provided. The piston 21 is conected to the stopped 14 by means of the piston rod 23.

A cycle timer which is a conventional motor operated shaft containing a plurality of cam operated electric switches is generally shown at 30 to control the operation of the electrically controlled air valves 31–34 at the appropriate times during each brew cycle so that air from the air reservoir 35 will be admitted to the appropriate air cylinder devices including the air cylinder 21 previously described.

During the brewing portion of the brew cycle the valve 32 is energized to admit air to the air cylinder 20 thus forcing the piston 21 and the brew stopper 14 downward with the stopper 14 in sealing engagement with the sealing surface 10a of the brew cylinder 10. The electric valve 32 is maintained energized for a period of time equivalent to the brewing portions of the brew cycle which may be several seconds during which air is to be admitted to the interior of the cylinder 10 to extract the brewed coffee through the filter screen 12 into the coffee outlet 13. At the end of the brewing portion of the brew cycle, the electric valve 32 is deenergized to vent the air in the cylinder 20 to atmosphere through the valve vent 32a.

According to the invention, the air for pressurizing the interior of the brew cylinder 10 during the brewing portion of the brew cycle is bled from within the cylinder 20 through an axial bore 40 extending through the piston 21 and the stopper 14. Thus so long as the electrically operated control valve 32 is energized and the stopper 14 is maintained in sealing engagement with the brew cylinder 10, air will be bled into the interior of the cylinder 10 for pressurizing the same and forcing the brewed coffee through the filter screen 12. It will be noted that this arrangement avoids the requirement of a separate electrically controlled air valve and an additional pressure reducing valve as described in the aforementioned copending patent application Ser. No. 741,027.

In order to prevent a too rapid rate of build-up of air pressure within the cylinder 10 during the brewing portion of the brew cycle, the bore 40 is provided with a restriction 41 that is more clearly seen in the offset enlarged portion of the drawing. Since this restriction is necessarily very small to keep the flow of air bled therethrough to an amount that will not raise the pressure within the brewing cylinder 10 above an excessive amount, say five to ten pounds per square inch during the brew time of the brew cycle, the preferred form of the invention provides for the use of filter elements such as the filter elements 42 and 43 in the path of the air flow to prevent foreign bodies from obstructing the restriction. While the preferred form of the invention provides two filters 42 and 43, in the interest of economy it may be unnecessary to use more than one filter such as the filter 42 and this is especially true if the supply of air in the air reservoir 35 is maintained essentially clean by filters at the air compressor (not shown). Under such circumstances only the filter 42 would be required to prevent coffee grounds or other foreign material from the within vicinity of the brew cylinder from accumulating at the restriction 41. Material for the filters 42 and 43 may be of any suitable known type and one such form of filter that has been successfully employed is comprised of sintered porous bronze. The relative dimensions for the restriction 41, the diameter of the plunger 14 and the diameter of the piston 21 together with the air pressure from the air reservoir 35 and the length of brewing time in the brew cycle are all a matter of design choice which may be varied depending on the strength of brewed coffee desired and the type of coffee grind employed. Also, the area of the filter screen, the size and the number of perforations of the filter screen 12, and the size of the coffee outlet are factors of design which would affect a choice for the size of the aperture 41. Therefore no attempt is made to limit the invention to any particular size of aperture since this can be readily determined as a matter of design choice.

Various modifications may be made within the spirit of the invention.

I claim:

1. An air operated coffee brewer of the type having a brew cup and a stopper movable into sealing relation with an upper open end of a brew cup during a brew cycle so that air under pressure may be introduced into the brew cup to force brewed coffee through a filter screen to a coffee outlet at the lower end of the brew cylinder, an air cylinder having a piston and rod connected to said stopper for moving the stopper into sealing relation with the brew cup during the brew cycle, and means for supplying air under pressure to the interior of said brew cup while said stopper is in the sealing relation comprising, an axial bore through said piston, rod and stopper, and an air restriction in said axial bore whereby air from said cylinder is bled into said brew cup in a manner to control the rate of pressure build-up within said brew cylinder.

2. The invention of claim 1 in which said restriction is provided with at least one porous filter in the path of the air flow therethrough to minimize clogging of the restriction by foreign matter.

3. The invention of claim 2 in which said filter is comprised of a porous sintered bronze material.

4. The invention of claim 1 in which a respective filter is provided on both sides of the restriction in the path of the air flow therethrough to minimize clogging of the restriction by foreign matter.

References Cited

UNITED STATES PATENTS

| 3,426,670 | 2/1969  | Wittern | 99—283   |
| 3,349,690 | 10/1967 | Heier   | 99—302 X |
| 3,369,478 | 2/1968  | Black   | 99—302   |

ROBERT W. JENKINS, Primary Examiner